US006405370B1

(12) United States Patent
Jarrell

(10) Patent No.: US 6,405,370 B1
(45) Date of Patent: Jun. 11, 2002

(54) TELEVISION AUDIENCE MONITORING SYSTEM AND METHOD EMPLOYING TUNER INTERFACE OF SET-TOP CONVERTER BOX

(75) Inventor: Lester L. Jarrell, Lakeside, CA (US)

(73) Assignee: ADcom Information Services, Inc., Escondido, CA (US)

( * ) Notice: Subject to any disclaimer, the term of this patent is extended or adjusted under 35 U.S.C. 154(b) by 0 days.

(21) Appl. No.: 09/169,056

(22) Filed: Oct. 9, 1998

(51) Int. Cl.[7] .................................................. H04N 7/16

(52) U.S. Cl. ............................................ 725/14; 725/18

(58) Field of Search ............................... 348/1, 10, 5.5; 455/2; 725/14, 15, 18

(56) References Cited

U.S. PATENT DOCUMENTS

| | | | | |
|---|---|---|---|---|
| 4,599,644 A | | 7/1986 | Fischer | 358/84 |
| 4,605,958 A | | 8/1986 | Machnik et al. | 358/84 |
| 4,613,904 A | | 9/1986 | Lurie | 358/142 |
| 4,642,685 A | | 2/1987 | Roberts et al. | 358/84 |
| 4,764,808 A | | 8/1988 | Solar | 358/84 |
| 4,847,685 A | | 7/1989 | Gall et al. | 358/84 |
| 4,907,079 A | | 3/1990 | Turner et al. | 358/84 |
| 4,912,552 A | | 3/1990 | Allison, III et al. | 358/84 |
| 5,294,981 A | | 3/1994 | Yazolino et al. | 348/4 |
| 5,305,464 A | | 4/1994 | Frett | 455/2 |
| 5,329,370 A | | 7/1994 | Yazolino et al. | 548/734 |
| 5,374,951 A | | 12/1994 | Welsh | 348/4 |
| 5,382,970 A | | 1/1995 | Kiefl | 348/1 |
| 5,450,122 A | * | 9/1995 | Keene | 348/1 |
| 5,495,282 A | | 2/1996 | Mostafa et al. | 348/5 |
| 5,689,799 A | * | 11/1997 | Dougherty et al. | 455/2 |
| 5,872,588 A | * | 2/1999 | Aras | 348/1 |
| 5,880,768 A | * | 3/1999 | Lemmons et al. | 348/1 |
| 5,881,360 A | * | 3/1999 | Fong | 455/2 |
| 5,945,988 A | * | 8/1999 | Williams et al. | 348/10 |
| 6,112,053 A | * | 8/2000 | Dunki-Jacobs et al. | 455/2 |
| 6,184,918 B1 | * | 2/2001 | Goldschmidt-Iki et al. | 348/1 |
| 6,202,210 B1 | * | 3/2001 | Ludtke | |

FOREIGN PATENT DOCUMENTS

| | | |
|---|---|---|
| DE | 24 52 926 | 5/1976 |
| DE | 3401 762 A1 | 8/1985 |
| DE | 37 42 426 A1 | 6/1989 |
| EP | 0 064 847 A2 | 11/1982 |
| EP | 0 127 068 | 12/1984 |
| EP | 0 430 711 A2 A3 | 6/1991 |
| EP | 0 687 083 | 12/1995 |
| EP | 0 763 950 | 3/1997 |
| FR | 2 555 383 | 5/1985 |
| FR | 2 717 025 | 9/1995 |
| FR | 2 738 977 | 3/1997 |
| GB | 2206253 A | 12/1988 |
| WO | WO 91/11062 | 7/1991 |
| WO | WO 94/14284 | 6/1994 |
| WO | WO 97/45973 | 12/1997 |
| WO | WO98/31114 | 7/1998 |

* cited by examiner

*Primary Examiner*—Victor R. Kostak
(74) *Attorney, Agent, or Firm*—Woodcock Washburn LLP

(57) ABSTRACT

A tuner interface device and method for determining a currently tuned-to channel of a set-top converter box having an electronic tuner that is addressable over a bus within the set-top converter box. The tuner interface device includes an electrical connection to the electronic tuner and a controller. The controller monitors communications over the bus for a unique identifier of the tuner and for commands to change channels that follow the unique identifier. When the unique identifier is received and it is verified that the commands to the tuner are to change a channel, the controller generates information representative of the new tuned-to tuned channel for use by downstream components. The information representative of the tuned channel may be output as an ASCII value representative of the currently tuned-to channel. The tuner interface may be part of a viewership metering system when used in conjunction with a viewership collection meter to determine viewer habits.

20 Claims, 4 Drawing Sheets

TELEVISION AUDIENCE MONITORING SYSTEM AND METHOD EMPLOYING TUNER INTERFACE OF SET-TOP CONVERTER BOX

FIELD OF THE INVENTION

The present invention relates to a device for monitoring usage of audiovisual equipment. In particular, the present invention relates to a device for interfacing with the tuner portion of set-top converter boxes to determine a channel being watched by a television viewer.

BACKGROUND OF THE INVENTION

Determining a number of viewers watching a particular television program is of great importance to television networks, stations, programmers and advertisers. Information regarding the number of viewers is used to determine market share and the ratings of particular programs. This information is additionally used to determine advertising rates, which in turn affects the revenue generated by the television networks and stations.

There are numerous systems known in the art that attempt to monitor the viewing habit of television watchers. Early attempts at monitoring were fairly simple and unsophisticated, and generally required viewers to maintain a diary of programs watched. As the viewers began and finished watching a particular channel or program, they entered a start and end time in to the diary. The viewers periodically mailed the diaries to a central collection location, which then processed the diaries. The disadvantages of such a system are many, including: failure to enter information into the diaries, inaccurate entries into the diaries, and delays in processing. Further, as the number of channels provided to households has increased dramatically, it has become increasingly difficult for viewers to accurately track their viewing habits.

Later attempts have become more sophisticated and efficient by automating portions of the data collection process and the determination of the channel currently being viewed. For example, U.S. Pat. No. 4,642,685, to Roberts et al., discloses a television monitoring system having a channel detection unit, a people monitoring unit, a transmission unit, and a receiving unit. The channel detection unit detects ultra or very high frequency radiation emitted from a television tuner to determine if the channel being tuned is one of the channels which have been preset into the detection unit. The detection is performed by a pick-up probe that inductively couples the signal emitted from the local oscillator of the television receiver. The people monitor unit is a powered handset that includes buttons assigned to each of the individuals who will be viewing the television set. The viewer depresses his or her assigned button to indicate he or she has started to watch the television. The viewing data is stored and transmitted by the transmission unit over household wiring to the receiving unit. The receiving unit sends the collected information to a central computer via a telephone connection. While this system speeds the data transmission process to the central computer as compared to mailing diaries to a processing center, there are several disadvantages in this system. For example, those of skill in the art will recognize that the location of the pick-up probe will greatly affect the sensitivity and accuracy of the channel detection unit. Further, as each viewer must manually depress a button on the people monitor, it is subject to the same inaccuracies of the diary method noted above, i.e., the failure of viewers to record the television channels actually watched.

U.S. Pat. No. 4,907,079, to Tuner et al., describes networked conventional audio and visual equipment that communicate via telephone lines with a remote central computer. The viewer provides channel selection commands or other programming commands to a microprocessor through an infrared remote control. A VCR tuner and TV tuner within the system provide audio and video signals for the conventional television monitor or television receiver. An AM and FM radio tuner may also be included, tunable by the microprocessor. In the Tuner et al. system, the video and/or audio signals from each tuner, video tape player, and disc players are coupled to the input side of an audio switch and a video switch. The switches are microprocessor controlled so that the audio and video program from any source may be coupled to any output or display device at the viewing location. The system includes a motion detector to determine the presence of viewers and provides for communication with a remote computer to monitor use of each networked audiovisual unit. While this system provides for monitoring and logging of each networked audiovisual unit, the Tuner et al. system is designed to control a large home-entertainment system, rather than a small-scale solution to monitoring viewers' habits. In particular, the Turner et al. system is indicated to cost a few hundred dollars, and would fail to provide a solution to television networks and advertisers who are interested in obtaining accurate viewing statistics by deploying systems to a relatively large number of viewers.

U.S. Pat. No. 4,912,552, to Allison, III, et al., describes a system that collects television channel tuning data that transmits the data to a central site in a transparent manner to the occupants of the household. The system is designed having a hub and spoke architecture, where the hub unit communicates with metering devices attached to television receivers and/or cable television converters. The meters are periodically polled by the hub, which then collects the data acquired by each meter. The hub communicates with a host computer via standard telephone lines. The Allison, III, et al. system particularly describes the central hub device and gathering data before transmitting it to the central site. However, the Allison, III et al. system fails to provide an improved metering unit by contemplating the use of known channel meters.

U.S. Pat. No. 5,374,951, to Welsh, discloses a system for monitoring and recording data related to television program viewing habits that includes a plurality of remote program monitor units that automatically report such data to a central computer via a conventional telephone network. The monitor unit reads a character string that is decoded from the demodulated television signal received by the unit. The character string is compared to a string table stored within the unit to determine the content being viewed by the television watcher. If there is a match, an event code and a time are stored in the unit for reporting to the central computer. However, for the system to operate, the character string must be encoded into the received television signal, otherwise there will be no match with the string table stored in memory. Further, the string table must be kept current for the system to provide accurate results.

U.S. Pat. No. 5,382,970, to Kiefl, describes a system for monitoring and collecting data on the viewing habits of television viewers that includes a portable personal data collection device that is separate from the television or set-top converter. The personal data collection devices includes a detector for providing a station identifier identifying the particular broadcast signal being received by the receiver, a clock for providing a signal representing time, a memory for storing data, and a cellular telephone module for communicating with a central location. The cellular telephone module periodically transmits stored data within the device to the central location. The viewer may enter channel information directly into the device, or the device may include a detector for detecting a channel selection signal from a television remote control to change the station identifier stored in memory. While this is an improvement over diaries, this system requires a personal data collection device for each individual watching a particular television set. Further, because the device is physically separate from the television set, the data collected may not be accurate as viewers may either fail to enter channel information or the device may not detect an infrared transmission from the television remote control.

U.S. Pat. No. 5,495,282, to Mostafa, et al., discloses a tuning/monitoring module for monitoring use of a video equipment without the use of probes by injecting RF signals into a cable converter and a VCR in order to detect channels selected by the cable converter and the VCR. In accordance with signals received from the cable converter and the VCR, the tuning/monitoring module can determine a selected channel being viewed by the viewers. Channel identification signals are also injected into the VCR and cable converter for recording by the VCR on videotape. The state of the "TV/VCR" switch of the VCR is determined by injecting a code signal into the VCR and determining whether that signal is present in an RF video signal output by the VCR. The receiver also receives data contained in channel identification signals. The receiver is selectively connectable to the VCR and the cable converter. However, this system requires the use of the special tuning/monitoring module in place of a tuner provided with a television or VCR in order to provided the injected signal to determine the viewed channel. Such a special tuning/monitoring module increases the expense associated with tracking viewers' habits.

In view of the above, there is a need for an integrated solution to detect the channels being watched by viewers. There is also a need for a system that does not interfere with any of the consumer's electronics, equipment or features. In particular, there is a need for a system that provides channel information without requiring addition steps to be taken by viewers, and that functions such that the consumer's VCR, TV, remote controls are not tampered with or opened and continue to operate normally.

SUMMARY OF THE INVENTION

In view of the above, the present invention, through one or more of its various aspects and/or embodiments is thus presented to accomplish one or more objects and advantages, such as those noted below.

In accordance with an aspect of the present invention, there is provided a tuner interface device for use in determining a currently tuned-to channel of a set-top converter box having an electronic tuner which tunes to a viewer-selected channel in response to commands provided thereto by the set-top converter device. The tuner interface device comprises an electrical connection to the electronic tuner and a controller. The controller is connected to the electronic tuner by the electrical connection and receives the commands transmitted to the electronic tuner to generate information representative of the currently tuned-to tuned channel.

According to a feature of the present invention, the tuner is electrically connected to a bus by which electrical components within the set-top converter box communicate, and the tuner is addressable by a unique identifier that is communicated over the bus. The controller monitors communications over the bus, and the commands are communicated to the electronic tuner following the communication of the unique identifier. When the unique identifier is communicated to the electronic tuner, the controller captures the commands in order to determine the currently tuned-to channel. The controller also determines if the commands are to change the electronic tuner from a first tuned-to channel to a second tuned-to channel and determines if the second tuned-to channel is different than the first tuned-to channel. If so, the second tuned-to channel is to become the currently tuned to channel.

According to another feature of the present invention, the information representative of the tuned channel may be output to a second device connected to the tuner interface via a second electrical connection, such that the second device may further process the information representative of the currently tuned-to channel. The controller may output the information as an ASCII value to a viewership meter connected to the tuner interface via the second electrical connection. The viewership meter may include an audio matching circuit to compare a first audio signal of a predetermined channel tuned by the viewership collection meter with a second audio signal output by a television to which the set-top converter is connected. If the first audio signal and the second audio signal match, the viewership collection meter determines that the channel to which the set-top converter box is tuned is the predetermined channel. Also, the tuner interface board may be adapted to receive power and additional data via the second electrical connection.

In accordance with another aspect of the present invention, there is provided a system for determining viewership of channels tunable by a set-top converter box having an electronic tuner. The system includes a tuner interface device connected to the electronic tuner and a viewership collection meter connected to the tuner interface which periodically stores a channel to which the set-top converter is tuned. The channel to which the set-top converter is tuned is determined by the tuner interface and communicated to the viewership collection meter. Further, the viewership collection meter stores the channel and forwards it to a predetermined location at selected times.

In accordance with another aspect of the present invention, there is provided a method of determining a currently tuned-to channel of a set-top converter box having an electronic tuner which tunes to a viewer-selected channel in response to commands provided thereto by the set-top converter device. The method comprises receiving the commands at the tuner interface; determining the currently tuned-to channel by interpreting the commands; generating a coded representation of the currently tuned-to channel; and outputting the coded representation.

According to another feature, the electronic tuner is electrically connected to a bus over which electrical components within the set-top converter box communicate, and the tuner is addressable by a unique identifier that is communicated over the bus. The step of receiving the commands at the tuner interface includes monitoring, at the controller, communications over the bus; determining when the unique identifier is communicated; and capturing the commands that follow the unique identifier.

According to another feature, the method further comprises determining if the commands comprise instructions to change from a first tuned-to channel to a second tuned-to channel different than the first tuned-to channel; and if so, designating the second tuned-to channel as the currently tuned-to channel.

According to still another feature, the step of generating a coded representation of the determined channel comprises generating an ASCII value of the channel to which the set-top converter box is tuned. Further, the step of outputting the coded representation comprises serially transmitting the ASCII value to a viewership meter.

Other features of the invention are described below.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like references numerals represent similar parts throughout the several views of the drawings, it being understood, however, that the invention is not limited to the specific methods and instrumentalities disclosed. In the drawings.

DETAILED DESCRIPTION OF THE PREFERRED EMBODIMENTS

The present invention provides a method and apparatus for detecting a channel to which a set-top converter box is tuned, where the set-top converter box includes an electronic tuner that communicates with other circuits via an internal bus such as an Inter-INTEGRATED CIRCUIT ($I^2C$) bus. The $I^2C$ bus is an industry standard interface that includes a serial data line (SDA) and a serial clock line (SCL). Devices connected to the bus are software addressable by a unique address and a simple master/slave relationship exists between devices at all times. Masters may operate as master-transmitters or master-receivers. If two or more master initiate transmissions simultaneously, the $I^2C$ bus has collision detection and data arbitration to prevent data corruption. Data is serially transmitted in 8-bit bytes at speeds ranging from 100 kBits/s to 400 kBits/sec. Each byte is acknowledged by the receiver. The number of devices that may be connected to the $I^2C$ bus is unlimited, however, the total capacitance of the bus is limited to 400 pF. More information on the $I^2C$ bus may found in the document entitled "The $I^2C$-Bus and How to Use It (Including Specifications)," published by Philips Semiconductor, 1995 Update, which is incorporated herein by reference in its entirety.

As is known in the art, conventional tuners in a modern set-top converter box operate in response to a series of predetermined commands that are passed over an industry standard $I^2C$ bus to tune to a user-selected channel. In accordance with the present invention, such commands are detected to determine the channel to which the tuner is tuned. Information related to the detected channel is forwarded to a data collection system within the subscriber's home or other location for eventual transmission to a central data collection and compilation site.

Figure 1:
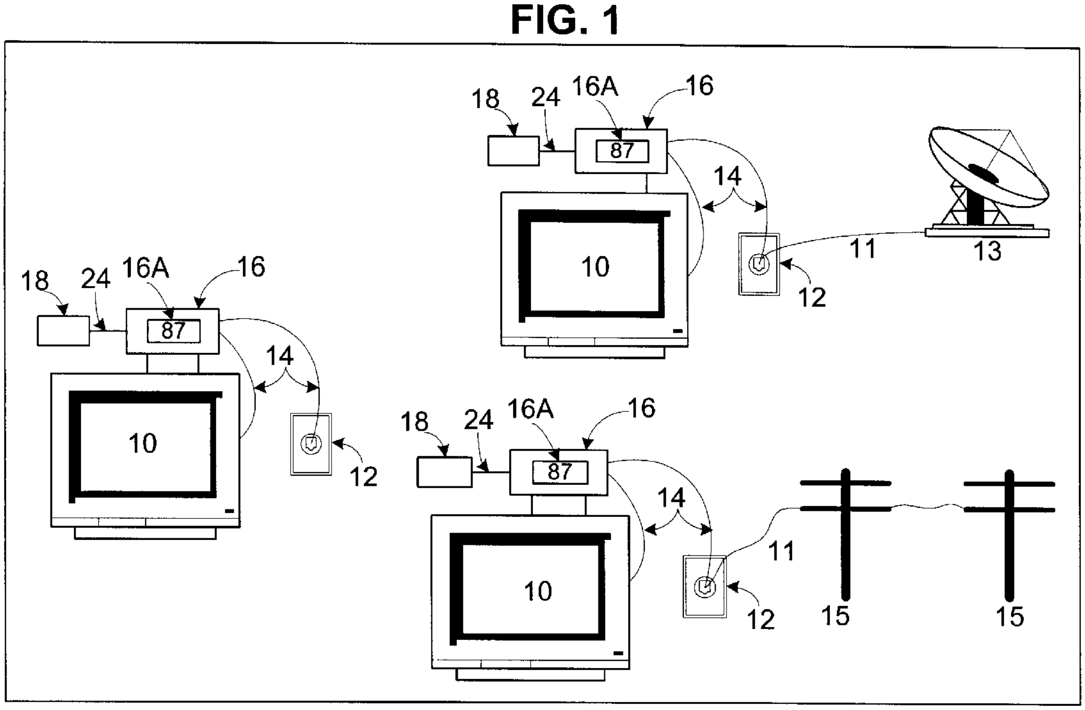
FIG. 1 is an overview of the environment in which the television audience monitoring system of the present invention may be implemented.

Referring to FIG. 1, there is illustrated an overview of an exemplary environment within which the present invention may be embodied. As illustrated, signals from a satellite/cable system provider are received via transmission lines 11 connected to one of a satellite dish 13 or power poles 15. The satellite dish 13 may receive signals from a plurality of earth orbiting satellites (not shown), whereas the transmission lines 11 strung over power poles 15 (or buried underground) may be connected to a transmission site (not shown). The transmission lines 11 enter the viewer's home or other location and are typically connected to a wall plate 12 having a 75 Ω co-axial connector.

To provide a signal to a viewer's television set 10, a first 75 Ω co-axial cable 14 electrically connects the transmission line 11, at the wall plate 12, to a first connection on, e.g., the rear panel of a set-top converter box 16. A second 75 Ω co-axial cable 14 connects between a second connection on the rear panel of the set-top converter 16 and to, e.g., a 75 Ω connector in a television set 10. The set-top converter box 16 preferably includes the aforementioned electronic tuner that communicates over an $I^2C$ bus and is used to selectively tune channels in accordance with a viewer selection. Alternatively, a single 75 Ω co-axial cable 14 may be used to provide signals directly to the television set 10.

The set-top converter 16 is connected to a viewership collection meter 18 by wires or a cable 24. Alternatively, an electrical connector or the like may be used in place of wires or cabling 24 to connect the viewership meter 18 and the set-top converter 16. The viewership meter 18 is designed such that it may connect to any television 10 or set-top converter 16. An appropriate number of subscriber homes within a cable or satellite system's broadcast base may be sampled using viewership meters 18, which obtain accurate data related to programs watched by the subscribers. The sample set is typically derived from demographic and lifestyle characteristics, shopping patterns, and consumer profile of the subscribers' homes. Ideally, the sample set of homes from the entire system should represent the system as a whole. To collect data, each of the homes to be sampled may be supplied with a viewership meter 18. The viewership meter is preferably supplied by ADcom Information Services, Inc., Carlsbad, Calif., and is installed on each television in the sampled homes. Such a meter is quickly and easily installed as compared to other known meters and provides a complete record of viewing in each participating household. When the quantitative ratings from the viewership meters are compiled, the information may be used by advertisers and network programmers to accurately target audiences and determine ideal spot placement for advertisements.

In accordance with an aspect of the present invention, the collection meter 18 determines a viewed channel by receiving channel-related information from an $I^2C$ interface board 22 (described below with regard to FIGS. 2 and 3). The collection meter 18 may also use an audio matching technique to log channel viewership throughout the day. The collection meter 18 is preferably capable of recording the channel location (i.e., the tuned channel) every five seconds, storing the information and forwarding it to a central computer (not shown). The data is forwarded by telephone or other means during time periods when the transmission to the central site is unlikely to interfere with the occupants' use of the transmission media. The central computer collects the data from all viewership meters 18, analyzes the information, combines the records with additional qualitative data, and sends prepared reports to the system operator as early as the next day. Preferably, hundreds, or even thousands of viewership meters 18 may be managed from one central system. Data and reports are received by the system operators via e.g., the Internet and Frame Relay routers. System personnel can quickly generate custom reports that show channel ratings by day, target and network ranking.

Figure 2:
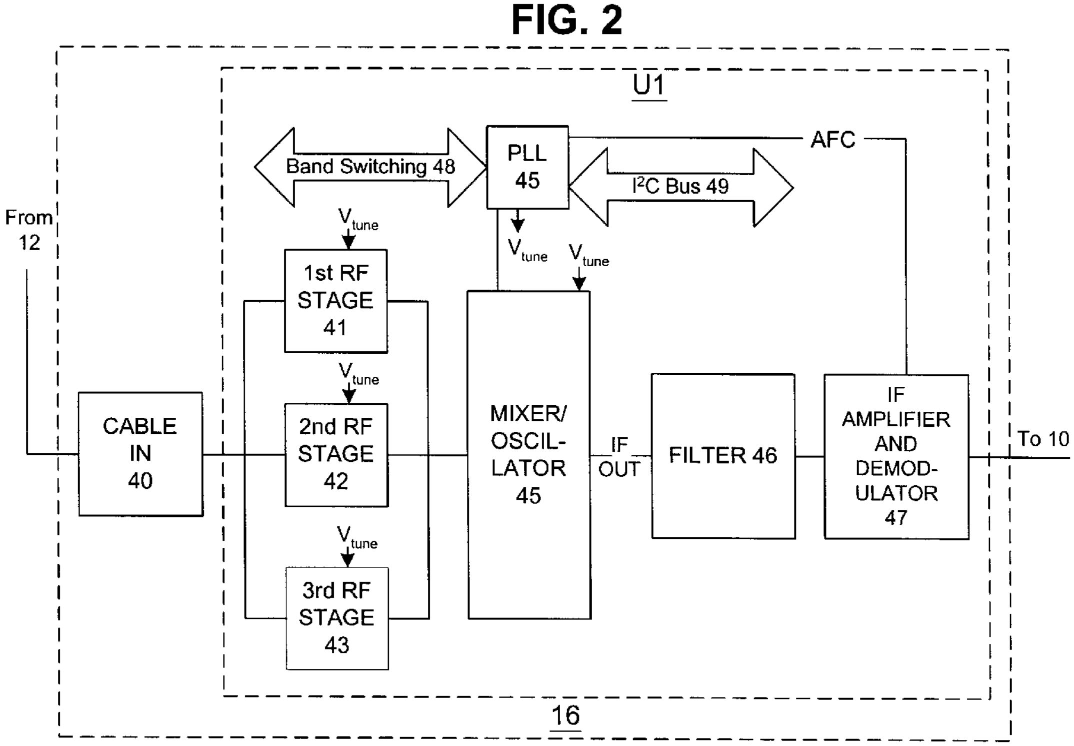
FIG. 2 is a block diagram illustrating portions of a television signal set-top converter box including a tuner section controlled over an $I^2C$ bus.
Figure 3:
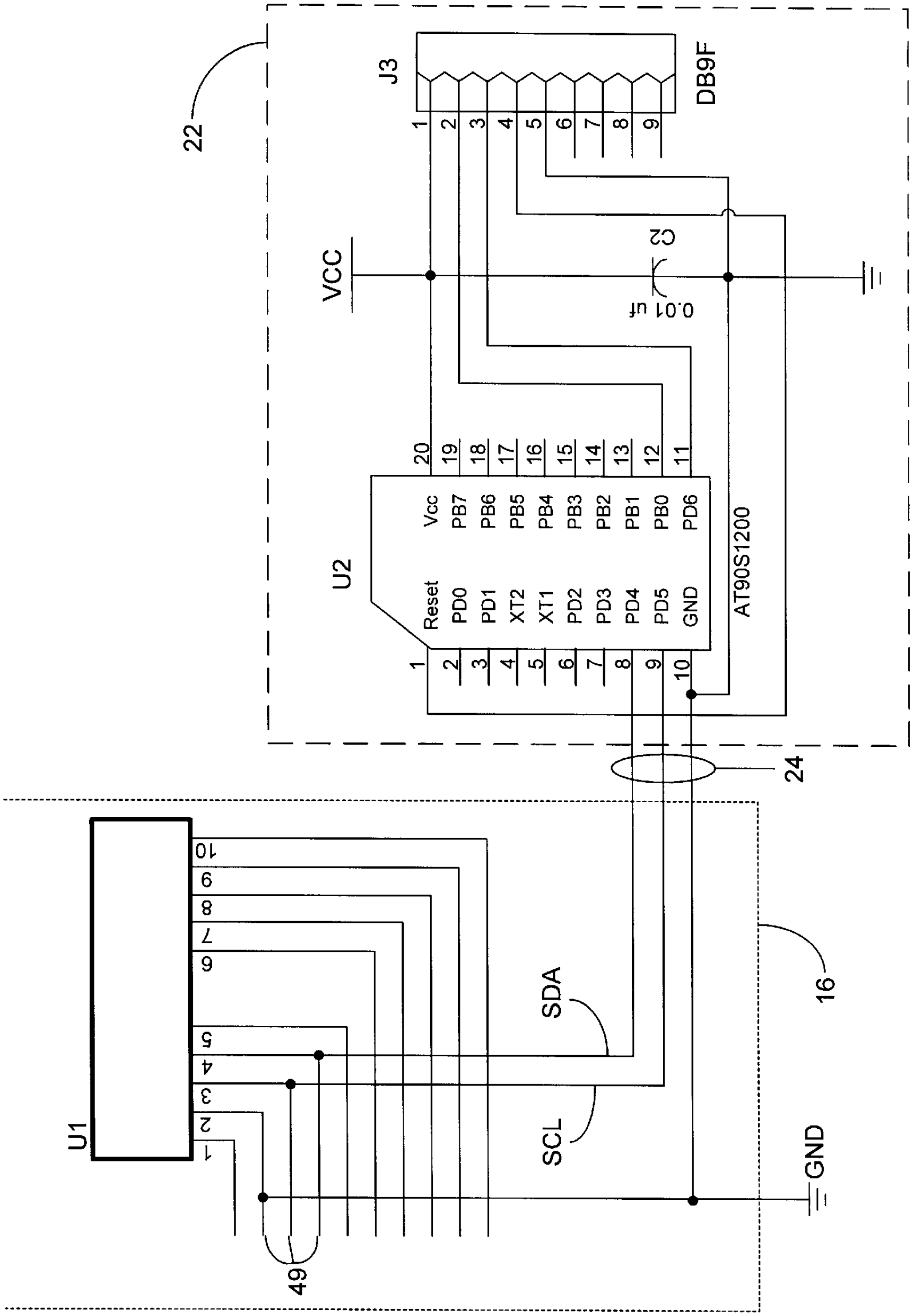
FIG. 3 is a schematic diagram illustrating the tuner section of the television signal converter box and an $I^2C$ interface circuit.

Referring now to FIGS. 2 and 3, there is illustrated an exemplary $I^2C$ bus capable tuner U1 within the set-top converter 16 and an $I^2C$ interface board 22 in accordance with the present invention.

The $I^2C$ bus capable tuner U1 contains a plurality of RF input stages 41–43, a phase-locked loop (PLL) frequency synthesizer 44, a mixer/local oscillator 45, a filter 46, an IF amplifier and demodulator 47, band switching input 48 and, an $I^2C$ bus interface 49. When a viewer selects a channel, commands are sent over the $I^2C$ bus to the PLL 44. In response thereto, the PLL 44 outputs an appropriate tuning voltage $V_{tune}$ and band switching signals such that the tuner 16 may tune-in the selected channel. The band switching signals enable one of the RF input stages 41–43 and the tuning voltage $V_{tune}$ is used to set the resonant frequency of the enabled RF input stage and the frequency of the oscillator 45. Automatic Frequency Control (AFC) feedback is provided to the PLL 44 to prevent drifting in order to maintain the oscillator 45 at the center frequency of the selected channel.

It is noted that the description of the above-mentioned $I^2C$ capable tuner has been provided herein for exemplary purposes only. Accordingly, the above-mentioned exemplary $I^2C$ tuner is not intended to limit the present invention as other similar electronic tuners that respond in accordance with commands issued in response to a viewer's channel selection are within the scope of the present invention.

The $I^2C$ (tuner) interface board 22 is preferably provided within the collection meter 18 and includes a microcontroller U2, a connector J3, and a capacitor C2, which is charged from a voltage source Vcc. The microcontroller U2 is preferably an 8-bit microcontroller having a Reduced Instruction Set Computer (RISC) architecture and includes dedicated digital input lines, digital output lines and an on-board programmable memory. The microcontroller U2 receives channel data from the set-top converter box tuner U1 via lines 24 connected to the $I^2C$ bus and the appropriate pins of an I/O port of the microcontroller U2 (to be described below). The microcontroller U2 stores the data in an internal random access memory (RAM) or other memory and converts the data into an ASCII channel value that is serially transmitted to the components within collection meter 18 over line 20 (FIG. 4) connected to connector J3. Other data formats compatible with the collection meter 18 may be used. The microcontroller U2 may also provide capabilities such as a real-time clock, a modem chip-set. Preferably, the microcontroller U2 comprises a AT90S1200, manufactured by Atmel Corporation, San Jose, Calif. Other similar microcontrollers may be used, as the present invention is not limited to the above-noted microcontroller.

As illustrated in FIG. 3, the interface board 22 is connected by wires 24 or other means to the tuner $I^2C$ command interface. As illustrated, the wires 24 connect to the SDA and SCL lines and to ground. The wires 24 are connected to appropriate port pins of the input/output (I/O) ports of the microcontroller U2. The microcontroller U2 outputs the ASCII channel value over an I/O port, which is in turn connected to connector J3. Additionally, other data and power may be transferred between the $I^2C$ interface board 22 and external devices over connector J3. It is noted that additional or fewer connectors may be provided on the tuner interface 22. For example, a single connector may be provided to provide all of the above-noted features at a reduced cost.

Figure 4:
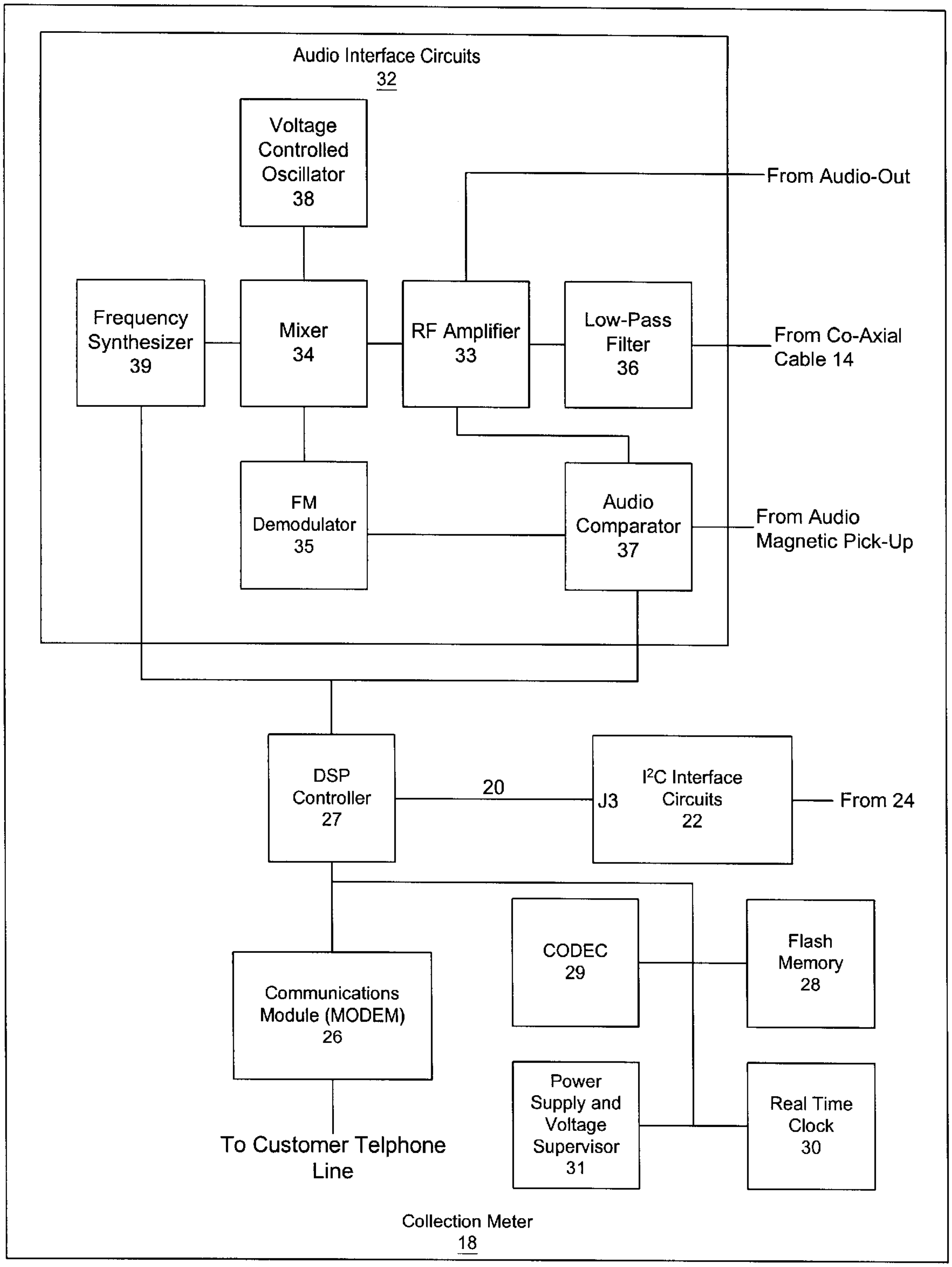
FIG. 4 is a block diagram of an exemplary collection meter in accordance with an aspect of the present invention.

FIG. 4 is a exemplary block diagram of the components within the collection meter 18. The collection meter 18 generates "snapshots" of selected channels on cable, satellite and standard air systems and compiles information related to the snapshots. The information may include the channel or channels viewed at a particular time or on a particular day. The compiled information may be used to generate viewership ratings and other research related services for multichannel subscriber television systems (e.g., cable television and satellite television).

The collection meter 18 includes Audio interface circuits 32, a communications module 26, a digital signal processor (DSP) controller 27, a flash memory 28 to store parameters and programming information for the DSP controller 27, a CODEC 29 to provide for compression and decompression of data (e.g., audio or video information) in accordance with predetermined mathematical algorithms, a real time clock 30, and a power supply and voltage supervisor 31. The DSP controller 27 may be programmed to provide functionalities such as, tuning to cable channel frequencies, detection of the state of the television (e.g., powered ON or OFF), detection of the channel being viewed, communication to the communications module 26, management of storage of snapshot information (e.g., time stamp), reception and storage of information related to a telephone number of a central collection site and time for sending snapshot information to the central site, dial-up capability to contact the central site and to upload the snapshot information, and a capability to receive time and reset the onboard real time clock during the upload. Additional features and functionalities may be provided as user requirements change by reprogramming the DSP controller 27. As illustrated, the DSP controller 27 receives information over line 20 from the $I^2C$ interface board 22 (from connection J3).

The dial-up capability is preferably programmed in firmware within the DSP controller 27 and is preferably not programmable by end-users (e.g., viewers). To performed the dial-up function, the communications module 27, which is connected to the customer's telephone line, is taken off-hook in accordance with the V.22 protocol at predetermined times and dual-tone multi-frequency (DTMF) signals are transmitted to call the central collection site. The telephone number of the central collection site is preferably coded into the firmware and may be changed by the central site during data communications. Using the V.22 protocol, the communications module 27 transmits signals representative of the data collected by the collection meter 18 to the central site. As illustrated in FIG. 4, the communications module 27 may comprise a MODEM.

The power supply 31 regulates the voltage to the communications module 27 and the Audio interface circuits 32. The power supply 31 receives, for example, 12VAC and may provide, ±5V and ±12V DC to the modules 27 and 32. The voltage supervisor portion monitors the +5V and +12V and resets the DSP controller 26 and the flash memory 28 if the supplied voltage drops below these values. The total power consumption is preferably less than 5 Watts.

The Audio interface circuits 32 include an RF amplifier 33, a mixer 34, an FM demodulator 35, a low-pass filter 36, audio comparator 37, voltage controlled oscillator (VCO) 38, and a frequency synthesizer 39. The broad-band cable signal to the television set 10 enters through a coaxial cable 14 coupled to the Audio interface circuits 32. The audio sub-carrier of a particular. cable channel is coupled to the low pass filter 36 and the RF amplifier 33 by a low-loss coupler. The signal is converted to a predetermined frequency (e.g., 3.25 MHz) by the mixer 34, the local oscillator 38 and the frequency synthesizer 39, which is controlled by the DSP controller 27. The predetermined frequency is demodulated by the FM demodulator 35 so the audio program for a tuned channel may be recovered. The audio signal from the television set 10 is obtained from an audio pick-up device (not shown) or from the audio jack 10*a* in the television set 10. The audio pick-up device is coupled to the television set 10 to detect the audio signal broadcast. The audio signal is fed to the RF amplifier 33 and then into an audio comparator 37. The recovered audio from the FM demodulator 35 is also fed into the audio comparator 37 and compared with the television audio signal. If the audio frequencies match, then a logic high signal is sent by the audio comparator 37 to the DSP controller 27. If there is not a match between the recovered audio from the FM demodulator 35 and the television audio, then the DSP controller 27 tunes the frequency synthesizer 39 to the next channel and continues until a match is found.

The collection meter 18 may be enclosed in an assembly (not shown) that includes intemal-metalized plastic covers. The Audio interface circuits 32 may be mounted on the bottom cover and the communication module 27 mounted up-side-down on the top of the Audio interface circuits 32. The $I^2C$ interface circuits 22 may be mounted on the top cover. The assembly may include the following interfaces: a 75 Ω cable in (54 MHz to 1 GHz, −16 dBmV to +10 dBmV), a power adapter in (12 VAC, <420 mA), audio in (1 $V_{p-p}$, 100 Hz to 5 kHz, >1 kΩ impedance), a magnetic sensor in (5 $mV_{p-p}$, 100 Hz to 5 kHz, 1 kΩ impedance), a POTS In/Out (RJ-11, meets FCC Part 68 requirements), and a power/mode indicator (green LED).

The various components and specifications noted-above with regard to the collection meter 18 have been provided herein for exemplary purposes only. Other components and different specifications are intended to be within the scope of the present invention. For example, the collection meter 18 may include a microprocessor or microcontroller and associated circuitry to perform the various functions of the DSP controller 27. Further, additional or fewer communications interfaces may be provided (e.g., power line data communication, RF data communication, or digital telephony).

Figure 5:
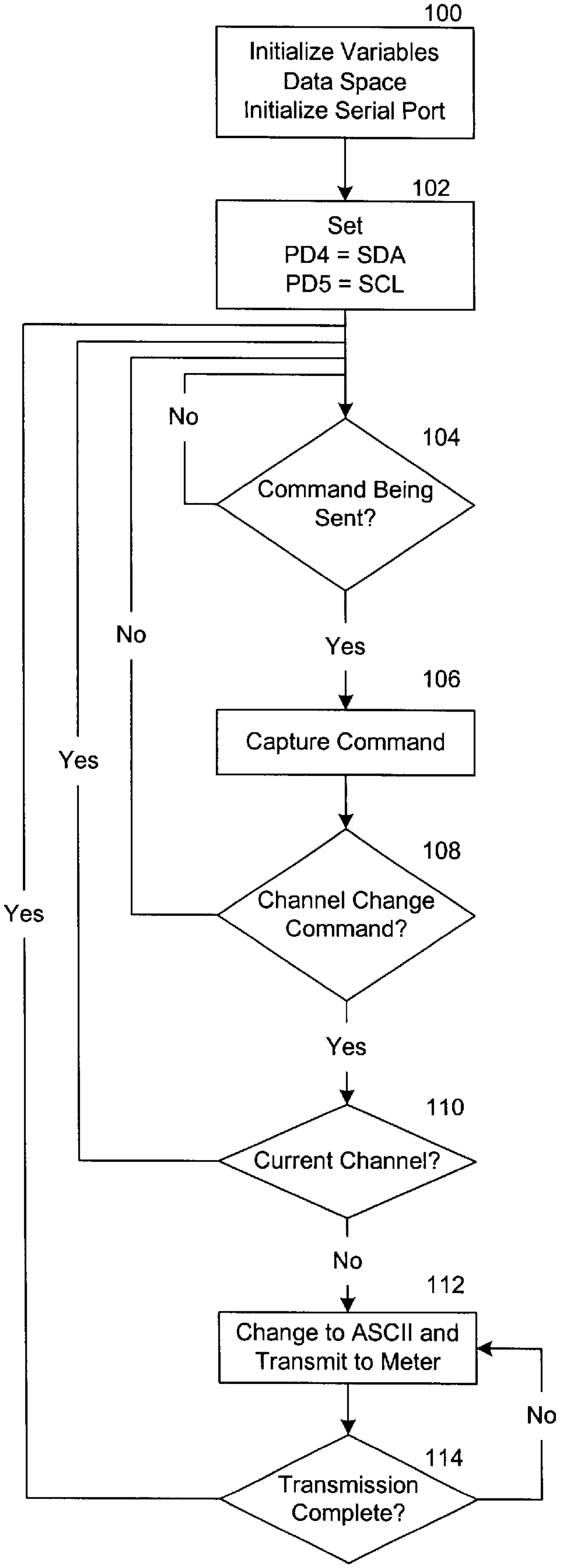
FIG. 5 is an exemplary flow chart illustrating the steps and processes performed by a microcontroller included with the $I^2C$ interface circuit.

FIG. 5 is a exemplary flowchart of the sequence of operations performed by the microcontroller U2 in accordance with an aspect of the invention. At step 100 the variables, data space and serial ports are initialized. At step 102, the microcontroller I/O ports are initialized and set. In the Atmel AT90S1200, two I/O ports are provided (Port B and Port D) having 8 and 7-bit widths. As noted in step 102 and illustrated in FIG. 3, bits 4–5 of Port D are set to receive the SDA and SCL lines of the $I^2C$ bus. Steps 100 and 102 are typically executed at power-up or during a reset operation.

At step 104 it is determined if a command is being sent to the tuner U1 over the $I^2C$ bus. The microcontroller U2 may perform this step by "listening" and interpreting the information on the $I^2C$ bus and determining when the unique address of the tuner U1 is transmitted. When it is determined that the tuner's unique identification has been transmitted, the microcontroller U2 captures the subsequent command to the tuner U1 at step 106. If not the process loops back to step 104 to await the transmission of commands to the tuner U1.

At step 108 it is determined if command captured at step 106 is to change the channel of the tuner U1. If not, the process loops back to step 104 to await the transmission of commands to the tuner U1. If the command is to change the channel, then at step 110, it is determined if the new channel to is the current channel. If so, then the process loops back to step 104 to await the transmission of commands to the tuner U1.

If the new channel is not the current channel at step 110, then at step 112 the captured channel information is converted by the microcontroller U2 into an ASCII value and transmitted to the collection meter 18 at step 114. Once the transmission is complete, the process loops back to step 104 to await the transmission of commands to the tuner U1.

As described above, the present invention provides for a novel apparatus and method for capturing information related to the channel to which a set-top converter box is tuned and for converting the information into data having a format compatible with a viewership data collection meter.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

For example, the set-top converter box 16 may be modified to include the components of the collection meter 18, such that a single set-top device performs the functions of both devices.

What is claimed is:

1. A tuner interface device for use in determining a currently tuned-to channel of a set-top converter box having an electronic tuner which tunes to a viewer-selected channel in response to commands provided thereto by said set-top converter device, said tuner interface device comprising:

an electrical connection to a communications bus of said electronic tuner, said communications bus carrying at least one signal representing said commands, said electrical connection being adapted to communicate said commands from said bus to said tuner interface device;

a controller, said controller being connected to said electronic tuner by said electrical connection and receiving said commands transmitted to said electronic tuner via said electrical connection, wherein said controller receives and interprets said commands to generate information representative of said currently tuned-to channel.

2. The tuner interface as recited in claim 1, wherein said tuner is electrically connected to the bus, wherein electrical components within said set-top converter box communicate over said bus, and wherein said tuner is addressable by a unique identifier that is communicated over said bus.

3. The tuner interface as recited in claim 2, wherein said controller monitors communications over said bus, and said commands are communicated to said electronic tuner following the communication of said unique identifier, and wherein when said unique identifier is communicated to said electronic tuner, said controller captures said commands in order to determine said currently tuned-to channel.

4. The tuner interface as recited in claim 3, said controller determining if said commands are to change said electronic tuner from a first tuned-to channel to a second tuned-to channel and determining if said second tuned-to channel is different than said first tuned-to channel, wherein said second tuned-to channel is to become said currently tuned-to channel.

5. The tuner interface as recited in claim 4, wherein said information representative of said tuned channel comprises an ASCII value representative of said currently tuned-to channel, and wherein said controller outputs said ASCII value to a viewership meter connected to said tuner interface via a second electrical connection.

6. The tuner interface as recited in claim 5, wherein said viewership meter comprises an audio matching circuit, said audio matching circuit comparing a first audio signal of a predetermined channel tuned by said viewership collection meter with a second audio signal output by a television to which said set-top converter is connected, wherein if said first audio signal and said second audio signal match, said viewership collection meter determines that said channel to which said set-top converter box is tuned is said predetermined channel.

7. The tuner interface as recited in claim 1, wherein said information representative of said tuned channel is output to a second device connected to said tuner interface via a second electrical connection, and wherein said second device receives and further processes said information representative of said currently tuned-to channel.

8. The tuner interface as recited in claim 7, wherein said second device comprises a viewership collection meter, and wherein said viewership collection meter stores said information representative of said currently tuned-to channel and forwards it to a predetermined location at selected times.

9. The tuner interface as recited in claim 8, wherein said information representative of said tuned channel comprises an ASCII value representative of said currently tuned-to channel, and wherein said controller outputs said ASCII value to said viewership meter via said second electrical connection.

10. The tuner interface as recited in claim 7, wherein said tuner interface device is adapted to receive power and additional data via said second electrical connection.

11. A system for determining viewership of channels tunable by a set-top converter box having an electronic tuner, said system comprising:

a tuner interface device connected to a communications bus of said electronic tuner, said tuner interface device adapted to determine a channel to which said set-top converter is tuned from commands on said communications bus; and a viewership collection meter connected to said tuner interface, said viewership meter periodically storing a channel to which said set-top converter is tuned, wherein said channel to which said set-top converter is tuned is determined by said tuner interface and communicated to said viewership collection meter, and wherein said viewership collection meter stores said channel and forwards it to a predetermined location at selected times.

12. The system for determining viewership of channels tunable by a set-top converter box as recited in claim 11, wherein said viewership collection meter further comprises an audio matching circuit, said audio matching circuit comparing a first audio signal of a predetermined channel tuned by said viewership collection meter with a second audio signal output by a television to which said set-top converter is connected, wherein if said first audio signal and said second audio signal match, said viewership collection meter determines that said channel to which said set-top converter box is tuned is said predetermined channel.

13. The tuner interface as recited in claim 12, wherein said tuner is electrically connected to a bus, wherein electrical components within said set-top converter box communicate over said bus, and wherein said tuner is addressable by a unique identifier that is communicated over said bus.

14. The tuner interface as recited in claim 13, wherein said controller monitors communications over said bus, and said commands are communicated to said electronic tuner following the communication of said unique identifier, and wherein when said unique identifier is communicated to said electronic tuner, said controller captures said commands in order to determine said currently tuned-to channel.

15. The tuner interface as recited in claim 14, said controller determining if said commands are to change said electronic tuner from a first tuned-to channel to a second tuned-to channel and determining if second tuned-to channel is different than said first tuned-to channel, wherein said second tuned-to channel is to become said currently tuned-to channel.

16. A method of determining a currently tuned-to channel of a set-top converter device having an electronic tuner which tunes to a viewer-selected channel in response to commands provided thereto by said set-top converter device, said method comprising:

tapping into a communications bus of said tuner, said bus carrying at least one signal representing said commands, and as a result of said tapping, receiving said commands at a tuner interface;

determining said currently tuned-to channel by interpreting said commands;

generating a coded representation of said currently tuned-to channel; and outputting said coded representation.

17. The method as recited in claim 16, wherein said electronic tuner is electrically connected to abus, over which electrical components within said set-top converter box communicate, and said tuner is addressable by a unique identifier that is communicated over said bus, said step of receiving said commands at said tuner interface comprising:

monitoring, at said controller, communications over said bus;

determining when said unique identifier is communicated; and capturing said commands that follow said unique identifier.

18. The method as recited in claim 17, further comprising:

determining if said commands comprise instructions to change from a first tuned-to channel to a second tuned-to channel different than said first tuned-to channel; and if so, designating said second tuned-to channel as said currently tuned-to channel.

19. The method as recited in claim 16, wherein said step of generating a coded representation of said determined channel comprises generating an ASCII value of said channel to which said set-top converter box is tuned.

20. The method as recited in claim 18, wherein said step of outputting said coded representation comprises serially transmitting said ASCII value to a viewership meter.

* * * * *

UNITED STATES PATENT AND TRADEMARK OFFICE

CERTIFICATE OF CORRECTION

PATENT NO. : 6,405,370 B1

DATED : June 11, 2002

INVENTOR(S) : Lester L. Jarrell

It is certified that error appears in the above-identified patent and that said Letters Patent is hereby corrected as shown below:

<u>Title page,</u>
Item [73], Assignee, delete “Escondido, CA” and insert -- Deerfield Beach, FL -- therefor;

<u>Column 5,</u>
Line 52, delete “master” and insert -- masters --;
Line 60, insert -- be -- after “may”;

<u>Column 8,</u>
Line 48, delete “performed” and insert -- perform -- therefor;

<u>Column 9,</u>
Line 7, delete “particular.” and insert -- particular -- therefor;

Signed and Sealed this

Thirty-first Day of December, 2002

JAMES E. ROGAN
*Director of the United States Patent and Trademark Office*